US011523585B2

(12) United States Patent
Hiroshima et al.

(10) Patent No.: US 11,523,585 B2
(45) Date of Patent: Dec. 13, 2022

(54) DOG TOILET

(71) Applicant: UNICHARM Corporation, Ehime (JP)

(72) Inventors: Kenji Hiroshima, Kagawa (JP); Takayuki Matsuo, Kagawa (JP)

(73) Assignee: Unicharm Corporation, Ehime (JP)

( * ) Notice: Subject to any disclaimer, the term of this patent is extended or adjusted under 35 U.S.C. 154(b) by 119 days.

(21) Appl. No.: 16/884,717

(22) Filed: May 27, 2020

(65) Prior Publication Data
US 2020/0281153 A1    Sep. 10, 2020

Related U.S. Application Data

(63) Continuation of application No. PCT/JP2018/043016, filed on Nov. 21, 2018.

(30) Foreign Application Priority Data

Dec. 22, 2017    (JP) .............................. JP2017-245897

(51) Int. Cl.
*A01K 1/01*    (2006.01)
*A01K 29/00*    (2006.01)
*A01K 5/02*    (2006.01)

(52) U.S. Cl.
CPC .............. *A01K 1/01* (2013.01); *A01K 1/0107* (2013.01); *A01K 5/02* (2013.01); *A01K 29/005* (2013.01)

(58) Field of Classification Search
CPC ....... A01K 1/0107; A01K 5/02; A01K 29/005
See application file for complete search history.

(56) References Cited

U.S. PATENT DOCUMENTS

| 3,971,371 A | * | 7/1976 | Bloom | A61F 5/48 128/886 |
| 9,585,366 B2 | * | 3/2017 | Ault | A01K 15/021 |
| 9,737,045 B1 | | 8/2017 | Scanlan et al. | |
| 2004/0050342 A1 | | 3/2004 | Armstrong | |
| 2004/0089058 A1 | * | 5/2004 | De Haan | G01N 27/225 604/385.01 |

(Continued)

FOREIGN PATENT DOCUMENTS

| JP | 2002082080 A | | 3/2002 | |
| JP | 2004507257 A | | 3/2004 | |
| JP | 2009045053 A | | 3/2009 | |
| JP | 2004507257 A | * | 3/2011 | ............... A01K 5/02 |
| WO | WO-9422401 A1 | * | 10/1994 | ............. A61F 13/42 |

OTHER PUBLICATIONS

International Preliminary Report on Patentability issued in PCTIJP2018/043016, dated Jun. 23, 2020 (6 pages).

(Continued)

Primary Examiner — Joshua D Huson
Assistant Examiner — Alanna K Peterson
(74) Attorney, Agent, or Firm — Osha Bergman Watanabe & Burton LLP

(57) ABSTRACT

A dog toilet includes: a receptacle in which a dog urinates; a urination detection sensor that includes a first electrode and a second electrode; and an operating device that operates based on a conducting state of the first electrode and the second electrode of the urination detection sensor. At least one of the first electrode and the second electrode is spaced apart from the receptacle. The dog toilet further includes an insulating member arranged between the receptacle and at least one of the first electrode and the second electrode.

10 Claims, 10 Drawing Sheets

(56) References Cited

U.S. PATENT DOCUMENTS

2009/0314223 A1* 12/2009 Yuu .................. A01K 15/02
119/720
2010/0064975 A1* 3/2010 McElroy, Jr. ............ A01K 5/02
119/61.55

OTHER PUBLICATIONS

Notification of Transmittal of Translation of the International Preliminary Report on Patentability for International Application No. PCT/JP2018/043016, dated Jul. 2, 2020 (1 page).
Office Action issued in corresponding Japanese Patent Application No. 2017-245897, dated Sep. 14, 2021, with translation (6 pages).
International Search Report issued in corresponding International Application No. PCT/JP2018/043016, dated Jan. 15, 2019, with translation (3 pages).
Written Opinion issued in corresponding International Application No. PCT/JP2018/043016, dated Jan. 15, 2019 (4 pages).
Extended European Search Report issued in corresponding European Application No. 18890120.1 dated Oct. 30, 2020 (7 pages).
Office Action issued in corresponding Chinese Patent Application No. 201880074958.1, dated Oct. 20, 2021, with translation (18 pages).
Office Action issued in counterpart Chinese Patent Application No. CN 201880074958.1 dated Mar. 28, 2022, with translation (11 pages).

* cited by examiner

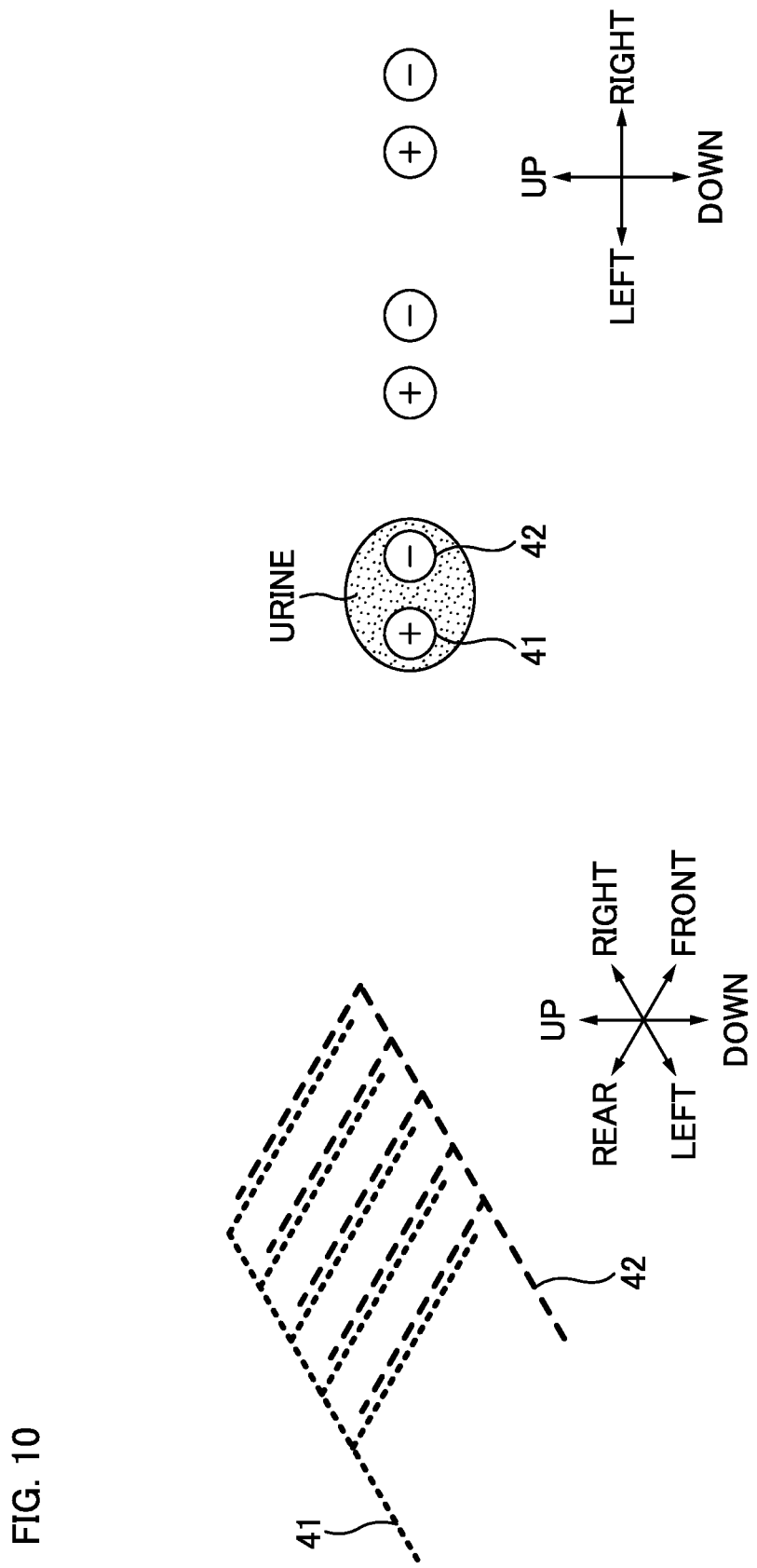

DOG TOILET

CROSS-REFERENCE TO RELATED APPLICATIONS

This application is based on and claims priority under 35 U.S.C. § 119 to Japanese Patent Application No. 2017-245897 filed on Dec. 22, 2017, the contents of which are incorporated herein by reference.

BACKGROUND

Technical Field

The present invention generally relates to a dog toilet.

Related Art

Conventionally, animal toilets used by animals such as pets (for example, dogs) are known. As animal toilets, there are also known toilets that give a stimulus (such as food, sound, or smell) when animals excrete in the toilets to train (toilet-train) the animals to spontaneously excrete in the toilets. For example, a toilet described in Patent Literature 1 includes: a urination detection sensor provided in a bottom portion; and a feeder (operating device) that operates on the basis of a detection result of the urination detection sensor. When the urination detection sensor detects excretion by an animal, the feeder operates to supply food.
Patent Literature 1: Japanese Patent Application Publication No. 2009-45053

However, in the toilet described above, there is a risk that the conducting state of the urination detection sensor continues after urination and causes the feeder to operate erroneously. For example, when the urination detection sensor conducts in response to the first urination, the conducting state continues until urine dries naturally. Consequently, there is a risk that the time at which urination completes cannot be determined, causing the feeder to continue operating. Further, there is a risk that continuation of the conducting state causes to fail detection of the second and subsequent urinations.

SUMMARY

One or more embodiments of the invention provide a dog toilet capable of preventing erroneous operation of an operating device.

A dog toilet according to one or more embodiments will be described below.

A dog toilet includes:
a receptacle in which a dog urinates;
a urination detection sensor including a first electrode and a second electrode; and
an operating device configured to operate based on a conducting state of the first electrode and the second electrode of the urination detection sensor.
At least one of the first electrode and the second electrode is spaced apart from the receptacle.
Embodiments of the present invention will become apparent from the following detailed description of exemplary embodiments with reference to the attached drawings.
According to one or more embodiments of the present invention, it is possible to provide a dog toilet capable of preventing erroneous operation of an operating device.

BRIEF DESCRIPTION OF THE DRAWINGS

FIG. 10 is an explanatory diagram illustrating an example of an arrangement in the case where a plurality of positive electrodes 41 and a plurality of negative electrodes 42 are arranged horizontally adjacently.

DETAILED DESCRIPTION

Figure 1:
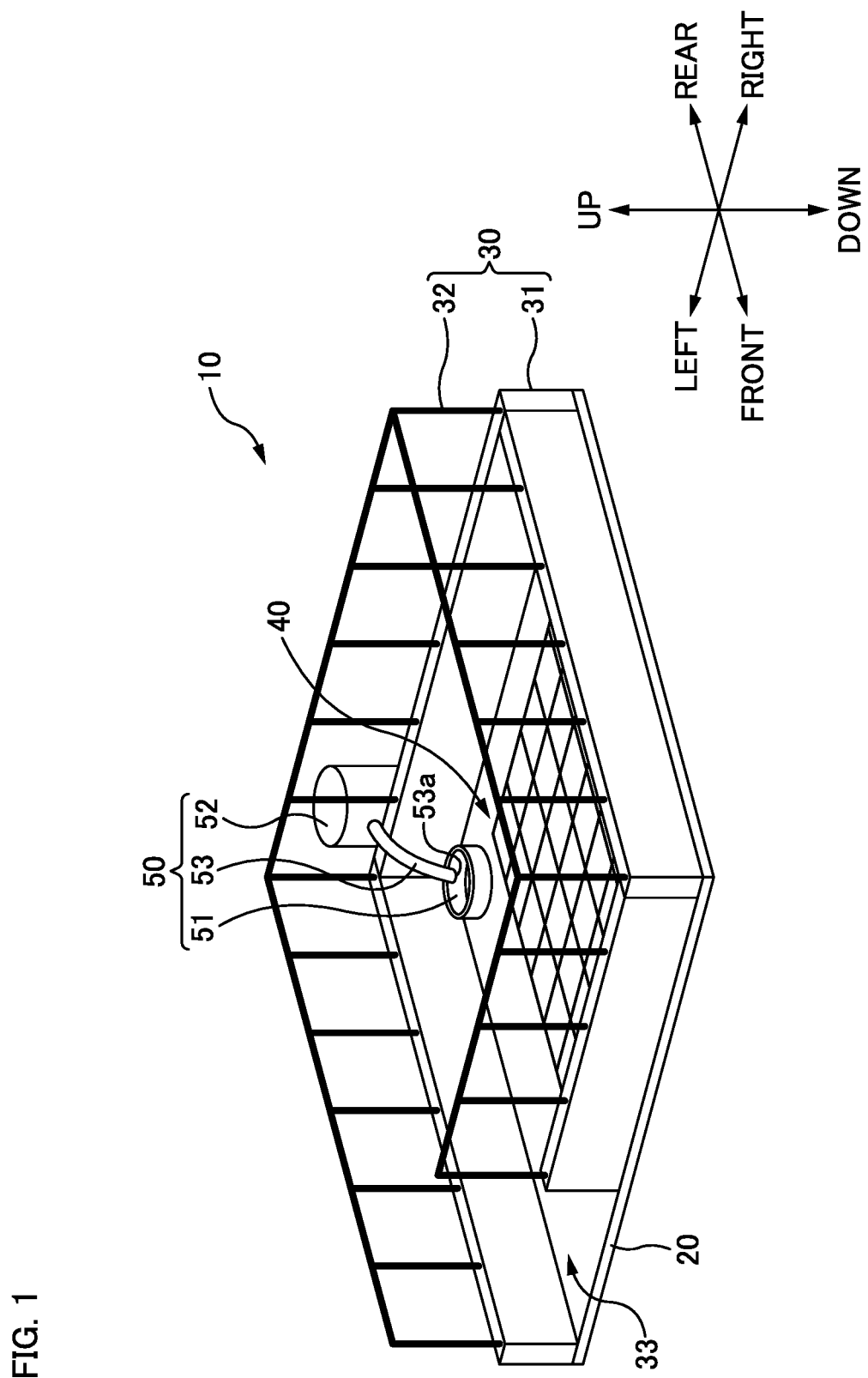
FIG. 1 is a schematic perspective view of a dog toilet 10.

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

A dog toilet includes:
a receptacle in which a dog urinates;
a urination detection sensor including a first electrode and a second electrode; and
an operating device configured to operate based on a conducting state of the first electrode and the second electrode of the urination detection sensor,
at least one of the first electrode and the second electrode being spaced apart from the receptacle.

With such a dog toilet, it becomes less likely for electricity to conduct except during the time of urination, making it possible to suppress the occurrence of erroneous operation of the operating device.

In such a dog toilet, an insulating member may be arranged between the receptacle and at least one of the first electrode and the second electrode.

With such a dog toilet, conduction of electricity between the first electrode and the second electrode through urine in the receptacle does not occur, making it possible to suppress the occurrence of erroneous operation of the operating device.

In such a dog toilet, the insulating member may be arranged between the first electrode and the second electrode.

With such a dog toilet, it is possible to prevent the first electrode and the second electrode from continuing conducting electricity through urine, making it possible to suppress the occurrence of erroneous operation of the operating device.

In such a dog toilet, a non-absorbent material may be used as the insulating member.

With such a dog toilet, urine is not held by the insulating member, making it possible to suppress the occurrence of erroneous operation of the operating device.

In such a dog toilet, the first electrode and the second electrode may be both spaced apart from the receptacle, and
an absorbent member is arranged below the first electrode and the second electrode,
the absorbent member including a liquid-absorbent absorbent body.

With such a dog toilet, since urine is absorbed by the absorbent member, it is possible to suppress the occurrence of erroneous operation caused, for example, by splashing of urine held in the receptacle due to vibration that occurs when a dog moves around wildly.

In such a dog toilet, at least one of the first electrode and the second electrode may be in contact with the absorbent member.

With such a dog toilet, it is possible for the absorbent member to absorb urine adhered to the electrodes. This can suppress the smell of urine, for example.

In such a dog toilet, the first electrode and the second electrode may be arranged on a liquid-permeable layer that covers the absorbent member.

With such a dog toilet, urine is quickly absorbed by the absorbent member. This makes it possible to reduce the amount of urine remaining on the electrodes. Consequently, it is possible to correctly detect the urination timing.

In such a dog toilet, the first electrode and the second electrode may be spaced apart from each other in a vertical direction, and
the first electrode and the second electrode at least partially overlap in a horizontal direction.

With such a dog toilet, the first electrode and the second electrode can certainly conduct electricity through urine that moves downward (flows downward) in the vertical direction.

In such a dog toilet, an insulating member may be arranged between the first electrode and the second electrode, and
a width of the insulating member may be greater than a width of the first electrode and greater than a width of the second electrode.

With such a dog toilet, urine covering a portion between the electrodes is more likely to undergo fluid thread breakup, making it possible to increase the accuracy of the urination detection sensor.

In such a dog toilet, a plurality of pairs of the first electrode and the second electrode may be arranged side-by-side in a horizontal direction.

With such a dog toilet, the electrodes can be arranged densely, making it possible to increase the accuracy of the urination detection sensor.

In such a dog toilet, the first electrode and the second electrode may be spaced apart from each other in a vertical direction,
the first electrode includes portions intersecting with each other, and
the second electrode includes portions intersecting with each other.

With such a dog toilet, the electrodes can be arranged more densely, making it possible to increase the accuracy of the urination detection sensor.

Embodiment

<Overall Configuration>

Figure 2:
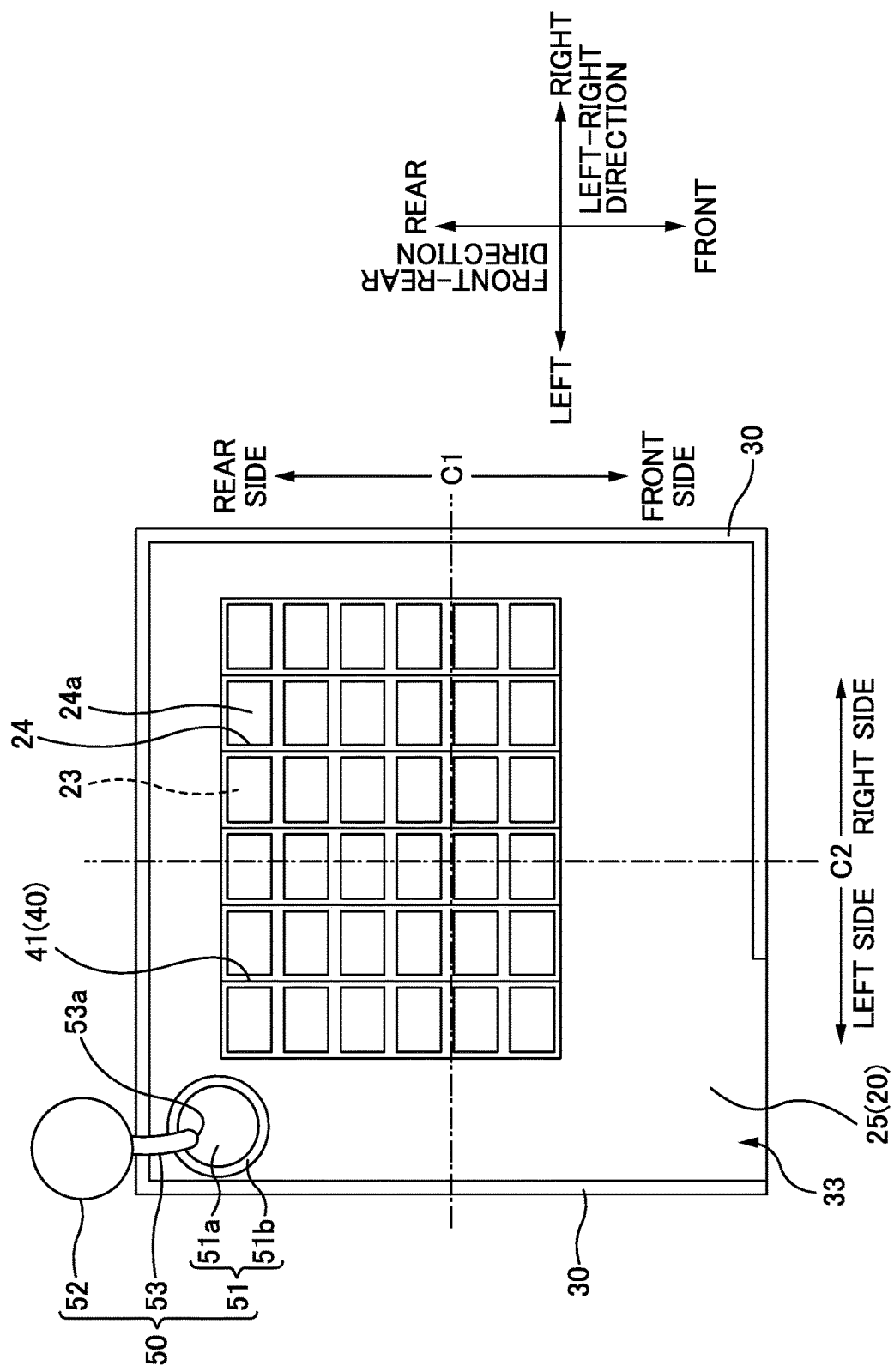
FIG. 2 is a plan view of the dog toilet 10 viewed from above.
Figure 3:
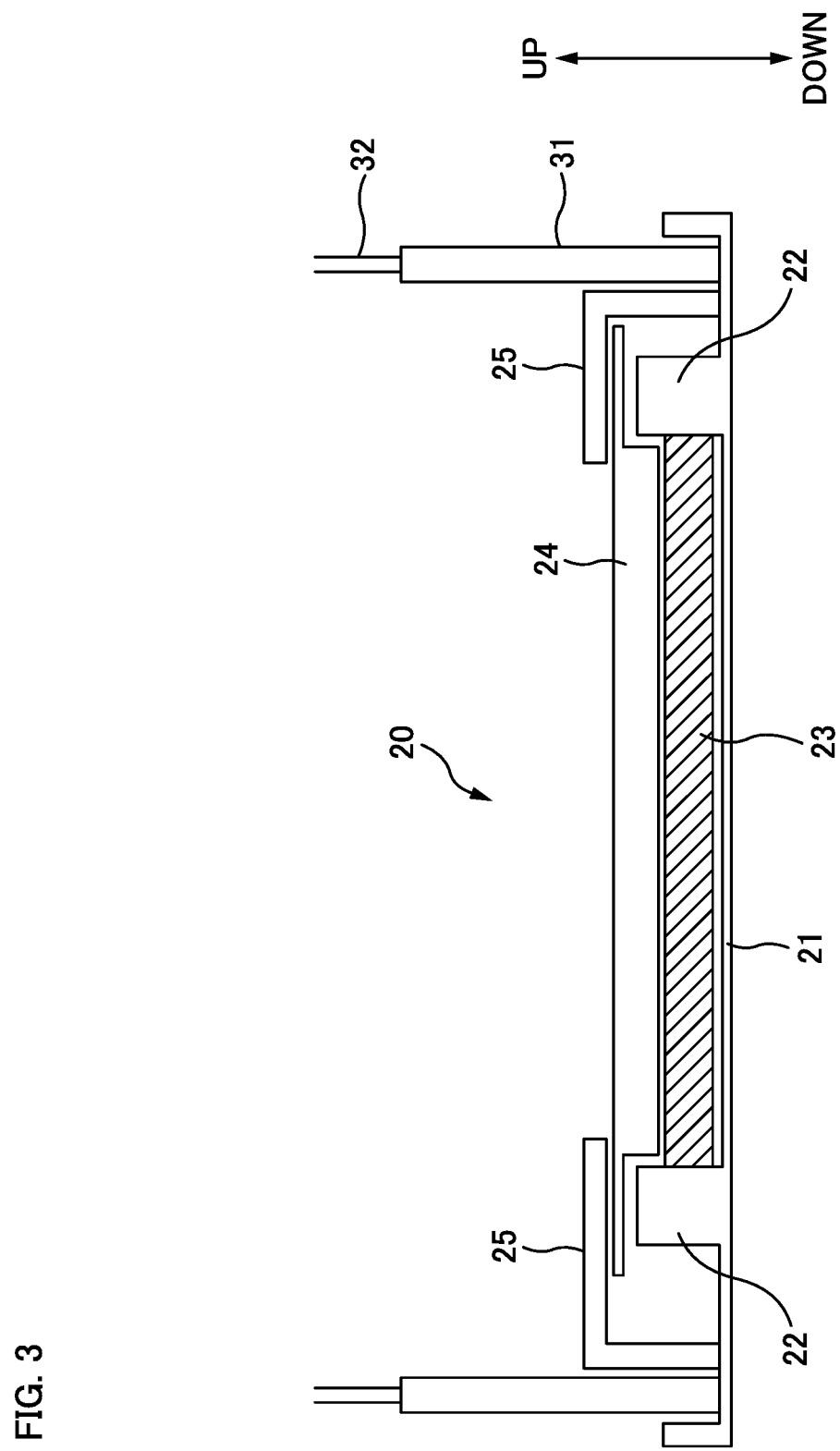
FIG. 3 is a sectional view illustrating a configuration of a bottom portion 20.
Figure 4A:
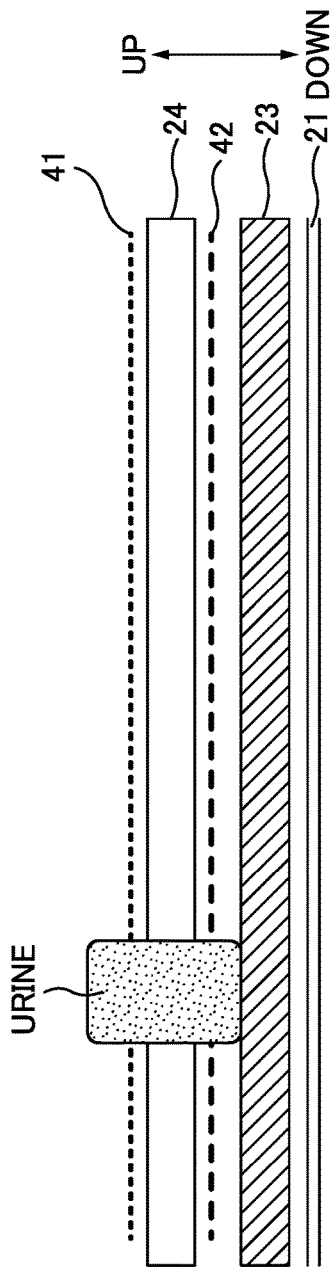
FIG. 4A is a sectional view illustrating an arrangement of individual electrodes (a positive electrode 41 and a negative electrode 42) in the bottom portion 20.
Figure 4D:
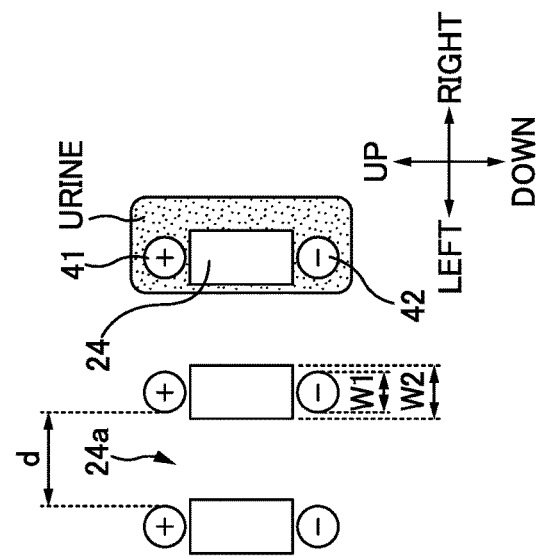
FIG. 4D is a sectional view.
Figure 4C:
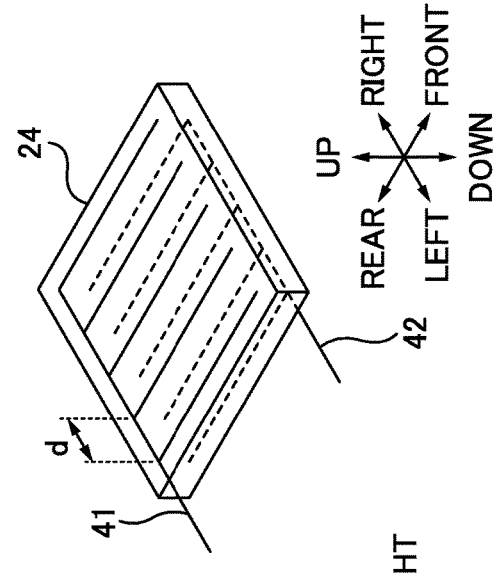
FIG. 4C is a perspective view of FIG. 4B.
Figure 4B:
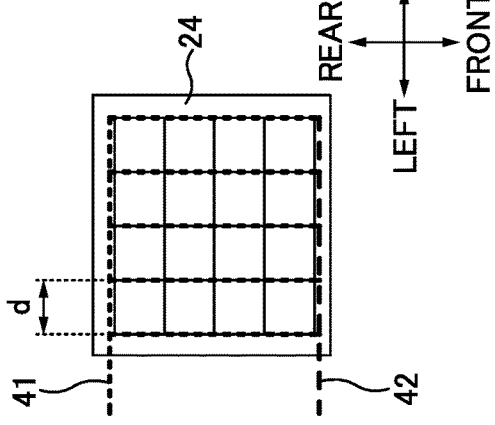
FIG. 4B is a plan view of a portion around a grate 24 viewed from above.
Figure 5:
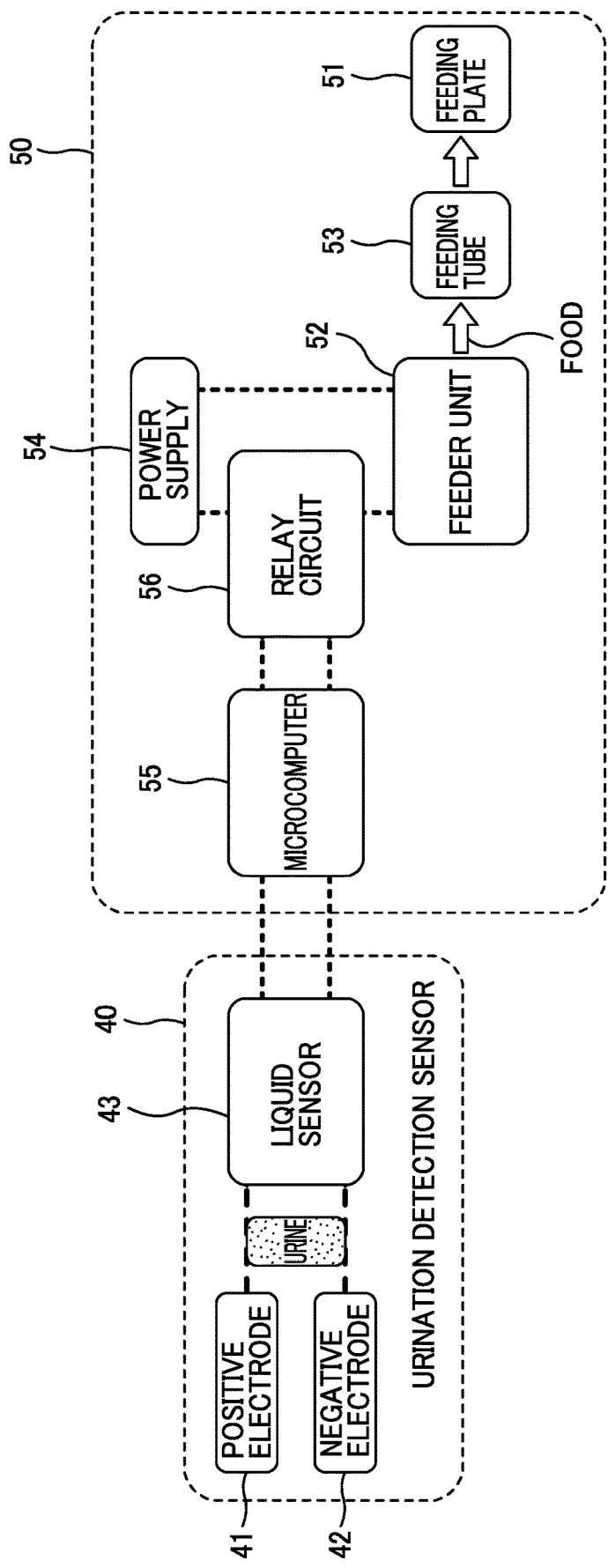
FIG. 5 is a block diagram illustrating configurations of a urination detection sensor 40 and a feeder unit 50.

A dog toilet 10 will be described as an example of a dog toilet according to one or more embodiments. FIG. 1 is a schematic perspective view of the dog toilet 10. FIG. 2 is a plan view of the dog toilet 10 viewed from above. In addition, FIG. 3 is a sectional view illustrating an example of a configuration of a bottom portion 20. Further, FIG. 4A is a sectional view illustrating an arrangement of individual electrodes (a positive electrode 41 and a negative electrode 42) in the bottom portion 20. In addition, FIG. 4B is a plan view of a portion around a grate 24 viewed from above, FIG. 4C is a perspective view of FIG. 4B, and FIG. 4D is a sectional view. Note that, in FIG. 4C, apertures 24a of the grate 24 are omitted to clarify the arrangement of the individual electrodes, and viewable portions of the electrodes are denoted by solid lines and hidden portions of the electrodes are denoted by broken lines. Further, FIG. 5 is a block diagram illustrating configurations of a urination detection sensor 40 and a feeder unit 50.

The dog toilet 10 is a toilet capable of being used for toilet-training a dog and is placed on the floor or the like for use. In the following description, "front-rear direction", "left-right direction", and "up-down direction", which denote three directions perpendicular to one another, are defined as illustrated in FIG. 1. The up-down direction is the vertical direction. A placement surface (a bottom surface of a bottom-portion main body 21) side is denoted as "lower side", and the opposite side is denoted as "upper side". In addition, the front-rear direction and the left-right direction denote directions of a horizontal plane (horizontal direction). As illustrated in FIG. 2, a central position in the front-rear direction is denoted as a center position C1. A side where an access opening 33 is provided relative to the center position C1 is denoted as "front side", and the opposite side is denoted as "rear side". In addition, a central position in the left-right direction is denoted as a center position C2. A side where the access opening 33 is provided relative to the center position C2 is denoted as "left side", and the opposite side is denoted as "right side".

The dog toilet 10 includes the bottom portion 20, a wall portion 30, the urination detection sensor 40, and the feeder unit 50.

As illustrated in FIG. 1 and FIG. 2, the bottom portion 20 has a rectangular shape in plan view, and respective sides of the bottom portion 20 extend in the front-rear direction and the left-right direction. In addition, as illustrated in FIG. 3, the bottom portion 20 includes the bottom-portion main body 21 (corresponding to a receptacle), a protruding portion 22, an absorption sheet 23 (corresponding to an absorbent member), the grate 24 (corresponding to an insulating member and a liquid-permeable layer), and a cover 25.

The bottom-portion main body 21 is the lowest portion (base) of the bottom portion 20 and is a portion that constitutes a toilet structure. An area surrounded by the protruding portion 22 in the bottom-portion main body 21 (in other words, an area where the absorption sheet 23 is arranged) is an area where a dog excretes. In the following description, this area is also referred to as an excretion area.

The protruding portion 22 is a portion that protrudes upward from the bottom-portion main body 21 and is provided so as to surround the absorption sheet 23. The bottom-portion main body 21 is provided with the protruding portion 22 in this manner, and the absorption sheet 23 is arranged inside the protruding portion 22. Consequently, the absorption sheet 23 is less likely to be displaced (the absorption sheet 23 is less likely to be moved) even if the dog walks around, for example.

The absorption sheet 23 is a liquid-absorbent sheet member that absorbs urine or the like excreted by an animal (herein, a dog), and the absorption sheet 23 includes a liquid absorbent material (corresponding to an absorbent body) such as pulp fiber or superabsorbent polymer. In addition, in one or more embodiments, the absorption sheet 23 contains deodorant microcapsules and an antibacterial agent, masking the smell of absorbed urine and suppressing the propagation of bacteria from occurring. The absorption sheet 23 is arranged in the excretion area (the area surrounded by the protruding portion 22 in the bottom-portion main body 21). As a result of the absorption sheet 23 being arranged in the excretion area in this manner, urine is absorbed by the absorption sheet 23. This makes it possible to suppress erroneous operation of the urination detection sensor 40 and a feeder 52 due to dispersal of urine caused by vibration that occurs when the dog moves around wildly, for example.

Note that, in one or more embodiments, the absorption sheet 23 (as well as the grate 24) is arranged to be lopsided with respect to the center position C1 in the front-rear direction. For example, the absorption sheet 23 is arranged such that the area of a portion on the rear side with respect to the center position C1 is larger than the area of a portion on the front side with respect to the center position C1 (see FIG. 2). This is because the possibility of the dog approaching a feeding plate 51 is high because of the smell of food remaining in the feeding plate 51 when the dog enters the dog toilet 10, and therefore the possibility of the dog urinating on the rear side relative to the center position C1 is high. Thus, making the area of the rear-side (feeding-plate-51-side) portion larger than the area of the front-side (access-opening-33-side) portion relative to the center position C1 makes it possible for the absorption sheet 23 to be arranged efficiently.

The grate 24 is arranged so as to cover the absorption sheet 23 (that is, in the excretion area). The grate 24 has the plurality of apertures 24a penetrating in the up-down direction and enables urine or the like excreted by the dog to pass through the apertures 24a from the upper side to the lower side (toward the absorption sheet 23) in the up-down direction. That is, the grate 24 corresponds to a liquid-permeable layer. The grate 24 according to one or more embodiments is formed into a rectangular grating shape, and the apertures 24a each have a rectangular shape in plan view. However, the configuration is not limited to this, and a grate having circular or hexagonal apertures may be used. As described later, the positive electrode 41 and the negative electrode 42 of the urination detection sensor 40 are arranged on the grate 24.

As a material of the grate 24, an insulator, particularly, a non-liquid-absorbent insulator that does not absorb liquid (for example, polypropylene, silicone, or the like) is used. This is because, if an absorbent insulator (for example, sponge) is used, the insulator absorbs urine. The absorbed urine causes the positive electrode 41 and the negative electrode 42 to continue conducting electricity, which hinders accurate determination. That the grate 24 is composed of a non-liquid-absorbent insulator makes it less likely for the grate 24 to hold urine. This makes it possible to prevent a first electrode and a second electrode from continuing conducting electricity. In addition, as the material of the grate 24, a hydrophobic material having a surface that increases surface tension may be used.

The cover 25 is attached above the bottom-portion main body 21 and covers the bottom-portion main body 21 and the protruding portion 22. In addition, the cover 25 has an opening in a portion corresponding to the position where the absorption sheet 23 is arranged (the excretion area). Consequently, the cover 25 constitutes an upper surface of the bottom portion 20 except for the excretion area. In addition, the grate 24 is suspended on the cover 25 in such a manner to move in the up-down direction.

The wall portion 30 is provided so as to surround the four sides of the bottom portion 20 (in the front-rear direction and the left-right direction). In the following description, an inner side of the wall portion 30 is also referred to as inside the toilet. The wall portion 30 according to one or more embodiments includes a plate wall 31, a fence 32, and the access opening 33.

The plate wall 31 is a plate-shaped wall that is continuous and is erected on the bottom portion 20. The plate wall 31 illustrated in FIG. 3 has side faces that are perpendicular to the horizontal plane and that have a constant thickness irrespective of the position in the up-down direction. However, the configuration of the plate wall 31 is not limited to this. For example, the plate wall 31 may be an inclined surface having a thickness that decreases from the lower side to the upper side in the up-down direction. Conversely, the plate wall 31 may also be an inclined surface having a thickness that increases from the lower side to the upper side in the up-down direction.

The fence 32 is a mesh-like barrier having voids and is provided above the plate wall 31.

Thus, the wall portion 30 of the dog toilet 10 according to one or more embodiments has a combined configuration of the plate wall 31 and the fence 32. The plate wall 31 constitutes the lower portion of the wall portion 30, and this ensures that food or urine of the dog are less likely to spill to an area outside the toilet. In addition, the fence 32 constitutes the upper portion of the wall portion 30, and this enables the dog to have good visibility, making it possible for the dog to urinate in the toilet with peace. In addition, a feeding tube 53 is easily drawn through the wall portion 30 to the inner side of the wall portion 30. Note that as materials of the plate wall 31 and the fence 32, any material, such as metal, plastic, or wood, may be used.

The access opening 33 is a portion where the dog enters and exits the toilet (the inner side of the wall portion 30) and is formed at the left side of a portion (front-side portion) of the wall portion 30 that demarcates the front side of the bottom portion 20. That is, the access opening 33 is provided on the front side relative to the center position C1 in the front-rear direction and on the left side relative to the center position C2 in the left-right direction. The access opening 33 according to one or more embodiments is formed by making an opening at the above-described portion of the wall portion 30 (the plate wall 31 and the fence 32) surrounding the bottom portion 20 (making the above-described portion discontinuous).

The urination detection sensor 40 is a sensor that detects whether there is urination by a dog (for example, the presence of liquid). The urination detection sensor 40 includes the positive electrode 41 (corresponding to a first electrode), the negative electrode 42 (corresponding to a second electrode), and a liquid sensor 43.

As illustrated in FIG. 4A and FIG. 4D, the positive electrode 41 is arranged on (the upper surface of) the grate 24. Note that as a material of the positive electrode 41, a material having high conductivity (for example, copper or rust-resistant stainless steel) may be used.

The negative electrode 42 is also formed of a material having high conductivity, similarly to the positive electrode 41, and is arranged under (on the lower surface of) the grate 24.

Thus, the positive electrode 41 and the negative electrode 42 are provided on the grate 24 that covers the absorption sheet 23. This make urine be quickly absorbed by the absorption sheet 23, making it possible to reduce the amount of urine that remains on the electrodes. Consequently, it is possible to correctly detect the urination timing.

In FIG. 4A, in order to clarify the arrangement, the grate 24 and the individual electrodes (the positive electrode 41 and the negative electrode 42), and the negative electrode 42 and the absorption sheet 23 are illustrated as spaced apart from each other. However, they are actually in contact with each other. By keeping the negative electrode 42 in contact with the absorption sheet 23, urine adhered to the negative electrode 42 can be absorbed by the absorption sheet 23. This can suppress, for example, the occurrence of the smell of urine. Since the grate 24 is suspended on the cover 25 to be vertically movable as described above, the negative electrode 42 is vertically movable together with the grate 24 even if the absorption sheet 23 expands due to absorbing urine.

As illustrated in FIG. 4C, the positive electrode 41 is divided into a plurality of branches on the grate 24, and the plurality of branches are linearly arranged extending along the front-rear direction with spaces therebetween in the left-right direction to be parallel to one another. In addition, the negative electrode 42 is also divided into a plurality of branches on the grate 24, and the plurality of branches are linearly arranged extending along the front-rear direction with spaces therebetween in the left-right direction to be parallel to one another (to form pairs with the positive electrode 41). A plurality of pairs of the positive electrode 41 and the negative electrode 42 are arranged side-by-side in the horizontal direction (the left-right direction). Consequently, the electrodes can be arranged densely, making it possible to increase the accuracy of the urination detection sensor 40. Note that the positive electrode 41 and the negative electrode 42 forming a pair are spaced apart in the up-down direction and superpose in terms of position in the horizontal direction (the left-right direction herein).

Although the positive electrode 41 is arranged on the grate 24 and the negative electrode 42 is arranged under the grate 24 according to one or more embodiments, the arrangement may be reversed. That is, the negative electrode 42 may be arranged on the grate 24 and the positive electrode 41 may be arranged under the grate 24. In addition, although each of the positive electrode 41 and the negative electrode 42 that constitute a pair is linearly arranged along the front-rear direction according to one or more embodiments, the arrangement is not limited to this. For example, each of the positive electrode 41 and the negative electrode 42 may be arranged in the left-right direction. In addition, each of the positive electrode 41 and the negative electrode 42 may be arranged to be bent in a zigzag shape on the horizontal plane in accordance with the shape of the grate 24. A distance d between the electrodes that are adjacent to each other in the horizontal direction may be arbitrary. However, since urine needs at least to be directly in contact with the electrodes, the distance may be 5 cm or less. In addition, if the distance is too short, it is difficult to remove feces soiling. Therefore, the distance may be 1 cm or greater.

In addition, a width W2 of the grate 24 illustrated in FIG. 4D is greater than a width W1 of the positive electrode 41 and the negative electrode 42. This is because, if the width W2 of the grate 24 is less than the width W1 of the positive electrode 41 and the negative electrode 42, there is a risk that urine remains on a side wall of the grate 24 owing to surface tension of the urine and the conducting state continues, and decreases the accuracy of the urination detection sensor 40. According to one or more embodiments, the width W2 of the grate 24 is set greater than the width W1 of the positive electrode 41 and the negative electrode 42. Thus, urine covering a portion between a pair of the positive electrode 41 and the negative electrode 42 is more likely to undergo fluid thread breakup, making it possible to increase the accuracy of the urination detection sensor 40.

The liquid sensor 43 amplifies an electric signal (voltage) when the positive electrode 41 and the negative electrode 42 conduct electricity, and outputs the amplified signal to a microcomputer 55. Note that, according to one or more embodiments, a method for controlling the liquid sensor 43 (and the microcomputer 55 described later) involves analog control using an analog voltage value. However, the control method is not limited to this, and digital control using H (high)/L (low) digital signals may be used.

When a dog urinates above the grate 24, urine passes through the positive electrode 41, the grate 24 (the apertures 24a), and the negative electrode 42 and is absorbed by the absorption sheet 23 as illustrated in FIG. 4A. At this time, the positive electrode 41 and the negative electrode 42 conduct electricity through the urine as illustrated in FIG. 4A and FIG. 4D, and an output voltage of the liquid sensor 43 rises. After the dog finishes urinating, an electrical conductor no longer exists between the positive electrode 41 and the negative electrode 42 because the grate 24 is a non-liquid-absorbent insulator. Therefore, the negative electrode 42 and the positive electrode 41 no longer conduct electricity (enters non-conducting state), decreasing the output voltage of the liquid sensor 43.

As illustrated in FIG. 5, the feeder unit 50 includes the feeding plate 51, the feeder 52, the feeding tube 53, a power supply 54, the microcomputer 55, and a relay circuit 56.

The feeding plate 51 is a container in which dog food is held. The feeding plate 51 includes a bottom wall 51a having a circular shape in plan view, and a peripheral side wall 51b that is erected upward on the periphery of the bottom wall 51a. As a result of the feeding plate 51 including the peripheral side wall 51b, food supplied from a feeding port 53a (described later) of the feeding tube 53 is prevented from rolling out onto the excretion area. Note that food is stored in a food container 100 (described later) of the feeder 52 and is supplied to the feeding plate 51 from the feeder 52 through the feeding tube 53.

As illustrated in FIG. 1 and FIG. 2, the feeding plate 51 (in other words, the feeding port 53a) is arranged in a corner portion (that is, a corner portion on a left rear side in the wall portion 30), and this corner portion is formed by a portion of the wall portion 30 on the rear side in the left-right direction and a portion of the wall portion 30 on the left side in the left-right direction. This can ensure a wide space (excretion area) in the toilet.

The feeder 52 is an electrically powered apparatus that automatically supplies food on the basis of a detection result of the urination detection sensor 40. The feeding tube 53 is attached to the feeder 52. Note that the feeder 52 is arranged outside the wall portion 30, and that the feeding tube 53 attached to the feeder 52 is drawn to the inner side of the wall portion 30 through the fence 32. The configuration of the feeder 52 will be described later.

The feeding tube 53 is a hollow tubular member (for example, a tube) for supplying food ejected from the feeder 52 to the feeding plate 51, and the feeding tube 53 has the feeding port 53a. The feeding port 53a is an outlet of the feeding tube 53 and is arranged above the feeding plate 51 in the toilet. That is, the feeding port 53a is arranged on the rear side relative to the center position C1 in the front-rear direction. As described above, according to one or more embodiments, the feeding plate 51 is arranged on the rear side in the front-rear direction and the access opening 33 is provided in the wall portion 30 on the front side in the front-rear direction. If the positions of the feeding port 53a and the access opening 33 are close to each other, the dog may discharge residual urine in an area outside the toilet while eating food. However, according to one or more embodiments, the positions of the feeding port 53a and the access opening 33 are apart from each other. This makes it possible for the dog who is eating food to stay in the toilet after urination, making it possible to prevent an area outside the toilet from being soiled with urine.

The power supply 54 supplies electric power to each of the components (the feeder 52, the microcomputer 55, and the relay circuit 56) of the feeder unit 50.

The output of the urination detection sensor 40 (the liquid sensor 43) is input to the microcomputer 55. The microcomputer 55 performs control described below, in accordance with a change in voltage of the urination detection sensor 40. That is, when the voltage falls below a predetermined voltage (because the positive electrode 41 and the negative electrode 42 stop conducting electricity) after the voltage rises (because the positive electrode 41 and the negative electrode 42 conduct electricity), the microcomputer 55 causes the relay circuit 56 to operate.

In accordance with the output of the microcomputer 55, the relay circuit 56 operates (is active) for a certain period according to controlling of the time in seconds, and thereby the relay circuit 56 causes the feeder 52 to operate (for example, a motor 120 described later is driven to rotate a rotational body 111). Consequently, food is supplied from the feeder 52.

Figure 6B:
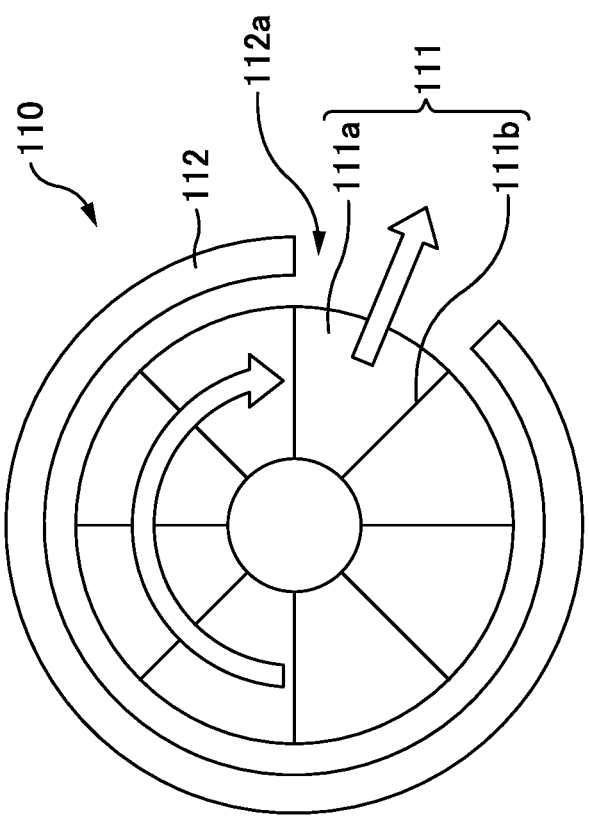
FIG. 6B is a top view of a scale 110 illustrated in FIG. 6A.
Figure 6A:
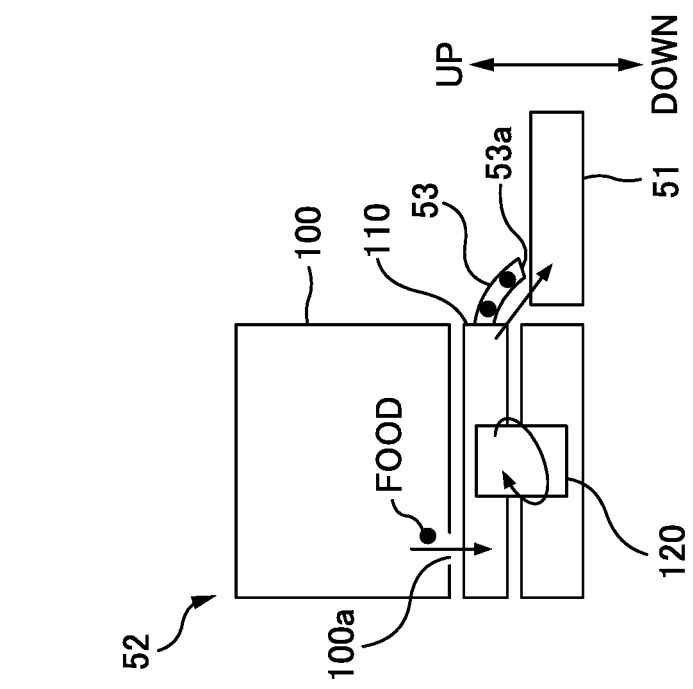
FIG. 6A is a schematic sectional view illustrating a configuration of a feeder 52.

FIG. 6A is a schematic sectional view illustrating an example of a configuration of the feeder 52, and FIG. 6B is a top view of a scale 110 illustrated in FIG. 6A.

The feeder 52 includes the food container 100, the scale 110, and the motor 120.

The food container 100 is a hollow cylindrical member provided in an upper portion of the feeder 52 and stores dog food therein. In addition, a through hole 100a is provided in a bottom portion of the food container 100, so that food drops from the through hole 100a due to its weight.

The scale 110 is a weigh scale arranged under the food container 100 and includes the rotational body 111 and a periphery wall portion 112.

The rotational body 111 includes a bottom portion 111a and a plurality of partition plates 111b.

The bottom portion 111a is a plate-shaped member having a circular shape in plan view. Note that an upper surface of the bottom portion 111a is an inclined surface where the height of an outer portion is lower than the height of the center position.

The partition plates 111b are provided on the upper surface of the bottom portion 111a. The plurality of partition plates 111b are provided radially at an equal interval, with respect to an axis located at the center of the bottom portion 111a. Consequently, the partition plates 111b partition a space above the bottom portion 111a into a plurality of spaces.

The periphery wall portion 112 is provided to surround the outer side of the rotational body 111. An opening 112a is formed in the periphery wall portion 112 at a position corresponding to one of partitioned portions formed by the partition plates 111b. In addition, outside the opening 112a, the feeding tube 53 is arranged. Food ejected from the opening 112a is supplied to the feeding plate 51 through the feeding tube 53.

The motor 120 is driven in accordance with the output of the relay circuit 56, rotating the rotational body 111 of the scale 110. That is, the motor 120 rotates the rotational body 111 in a circumferential direction around the axis located at the center of the rotational body 111.

Operation of the urination detection sensor 40 and the feeder unit 50 will be described below.

When a dog urinates above the grate 24 and urine reaches the positive electrode 41 and the negative electrode 42 of the urination detection sensor 40, the positive electrode 41 and the negative electrode 42 conduct electricity through the urine, which is an electrical conductor. The conducted voltage is amplified by the liquid sensor 43 and is sent to the microcomputer 55. When the output of the urination detection sensor 40 (the liquid sensor 43) falls below a predetermined voltage as a result of the dog finishing urinating, the microcomputer 55 causes the relay circuit 56 to operate for a certain period. Consequently, the motor 120 of the feeder 52 is driven to rotate the rotational body 111 of the scale 110 by a certain amount. As a result of the rotational body 111 rotating, food located between the adjacent partition plates 111b of the scale 110 is ejected from the opening 112a of the periphery wall portion 112 and is supplied to the feeding plate 51 through the feeding tube 53. In this manner, food is automatically supplied in response to urination by the dog. In addition, food stored in the food container 100 is dropped through the through hole 100a to the scale 110 located below (to a portion which has become empty as a result of food having ejected from the opening 112a).

Although the absorption sheet 23 and the grate 24 are arranged above the bottom-portion main body 21 in the dog toilet 10 according to one or more embodiments, the absorption sheet 23 and the grate 24 may be omitted. In this case, however, there is a risk that the urination detection sensor 40 fails to correctly detect urination, causing the feeder 52 to erroneously operate.

Figure 7:
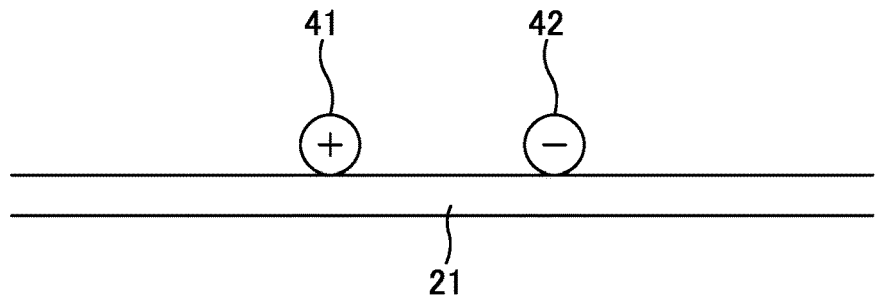
FIG. 7 is a conceptual diagram illustrating a comparative example of the arrangement of the electrodes.

FIG. 7 is a conceptual diagram illustrating a comparative example of the arrangement of the electrodes.

In FIG. 7, the positive electrode 41 and the negative electrode 42 are arranged on the bottom-portion main body 21 to be in contact with the bottom-portion main body 21. Also in this case, the positive electrode 41 and the negative electrode 42 conduct electricity through urine when a dog urinates. In this comparative example, however, the conducting state continues until urine dries naturally. For this reason, the time at which urination completes cannot be determined, and there is a risk that the feeder 52 continues operating. Further, as a result of continuation of the conducting state, there is a risk that detection of the second and subsequent urinations fail.

In contrast, the positive electrode 41 and the negative electrode 42 are spaced apart from the bottom-portion main body 21 in the dog toilet 10 according to one or more embodiments. This makes it possible to suppress the occurrence of erroneous operation of the feeder 52.

[First Modification]

Figure 8A:
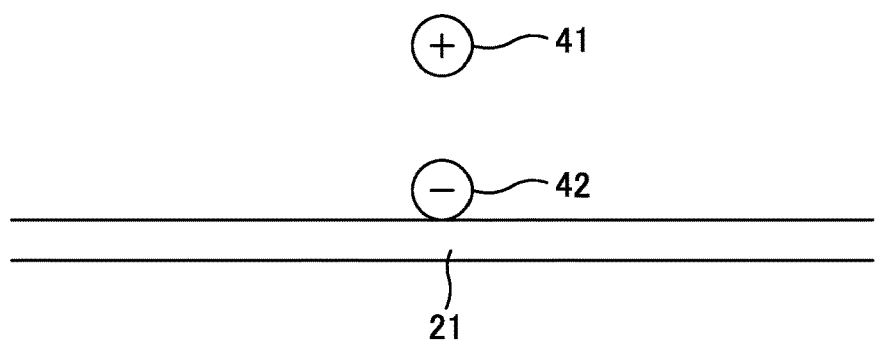
FIG. 8A is a conceptual diagram illustrating a first modification of the arrangement of the electrodes.
Figure 8B:
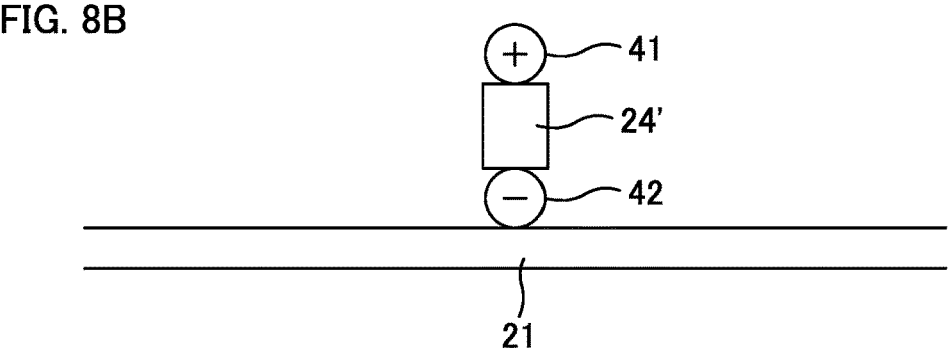
FIG. 8B is a conceptual diagram illustrating an improved example of FIG. 8A.

FIG. 8A is a conceptual diagram illustrating a first modification of the arrangement of the electrodes. FIG. 8B is a conceptual diagram illustrating an improved example of FIG. 8A. In the first modification illustrated in FIG. 8A, neither the absorption sheet 23 nor the grate 24 is provided as in the comparative example (FIG. 7). In addition, in the first modification, the positive electrode 41 and the negative electrode 42 are arranged above the bottom-portion main body 21 such that the positive electrode 41 and the negative electrode 42 are adjacent to each other in the up-down direction (vertical direction) and overlap in terms of position in the horizontal direction. For example, the negative electrode 42 is in contact with the bottom-portion main body 21, and the positive electrode 41 is provided above the negative electrode 42. That is, the positive electrode 41 is spaced apart from the bottom-portion main body 21. Although the positions of the positive electrode 41 and the negative electrode 42 in the horizontal direction are completely coincident in FIG. 8A, the positions may be at least partially coincident (may be slightly shifted from each other in the horizontal direction). With this configuration, when urine makes contact with the positive electrode 41, the urine drips to the negative electrode 42 along the positive electrode 41 due to its weight. Therefore, the positive electrode 41 and the negative electrode 42 conduct electricity, and urination can be detected. In this case, however, there is a risk that the urine continues dripping from the positive electrode 41, causing the positive electrode 41 and the negative electrode 42 to continue conducting electricity.

In the improved example illustrated in FIG. 8B, an insulating member 24' is arranged between the positive electrode 41 and the negative electrode 42. The insulating member 24' is a non-absorbent insulating member composed of the same material as the grate 24. By arranging the insulating member 24' between the positive electrode 41 and the negative electrode 42 in this manner, it is possible to prevent the positive electrode 41 and the negative electrode 42 from continuing conducting electricity.

[Second Modification]

In the embodiments described above and in the first modification, the positive electrode 41 and the negative electrode 42 forming a pair are disposed vertically adjacently. However, the positive electrode 41 and the negative electrode 42 forming a pair are disposed horizontally adjacently in the second modification.

Figure 9A:
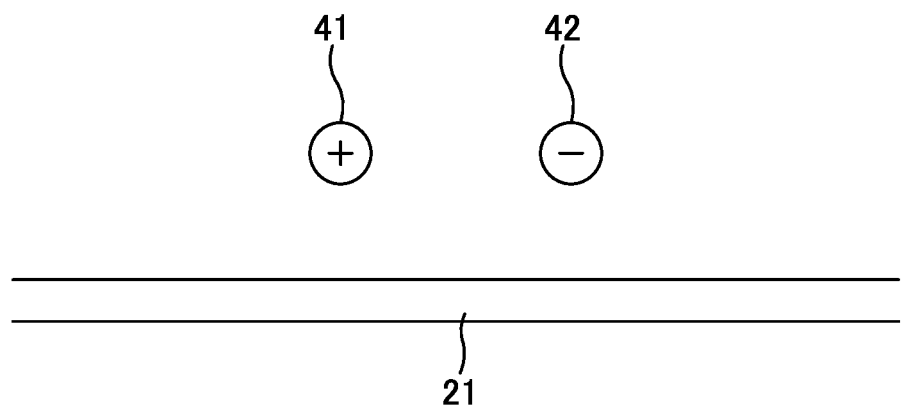
FIG. 9A is a conceptual diagram illustrating a second modification of the arrangement of the electrodes.
Figure 9B:
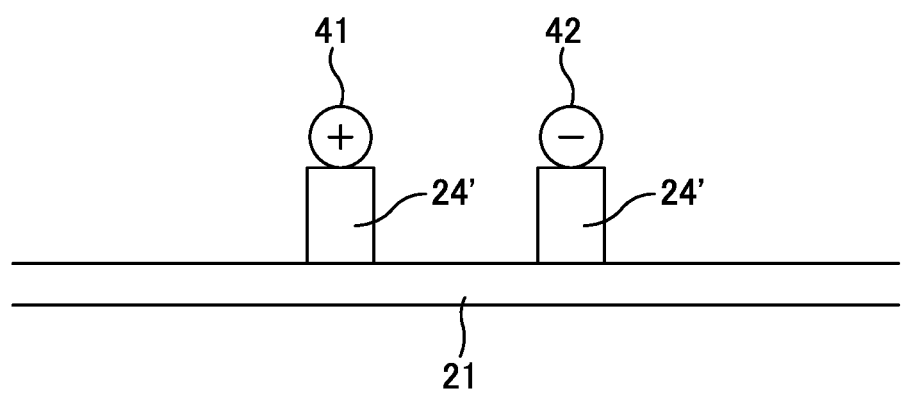
FIG. 9B is a conceptual diagram illustrating an improved example of FIG. 9A.

FIG. 9A is a conceptual diagram illustrating a second modification of the arrangement of the electrodes. FIG. 9B is a conceptual diagram illustrating an improved example of FIG. 9A.

In the second modification illustrated in FIG. 9A, neither the absorption sheet 23 nor the grate 24 is provided as in the comparative example (FIG. 7). In addition, the positive electrode 41 and the negative electrode 42 are arranged adjacently in the horizontal direction. Both the positive electrode 41 and the negative electrode 42 are spaced apart from the bottom-portion main body 21. Also in the second modification, it is possible to suppress the occurrence of erroneous operation, compared with the comparative example (FIG. 7). However, there is a risk that the positive electrode 41 and the negative electrode 42 continue conducting electricity due to urine dripping from the positive electrode 41, or urine accumulated in the bottom-portion main body 21, or urine dripping from the negative electrode 42.

In the improved example illustrated in FIG. 9B, the insulating member 24' is arranged between the positive electrode 41 and the bottom-portion main body 21 and between the negative electrode 42 and the bottom-portion main body 21. The insulating member 24' is a non-absorbent insulator similar to the grate 24. By arranging the insulating member 24' between the positive electrode 41 and the bottom-portion main body 21 and between the negative electrode 42 and the bottom-portion main body 21, the positive electrode 41 and the negative electrode 42 can be prevented from continuing conducting electricity through urine on the bottom-portion main body 21. Consequently, erroneous operation of the feeder 52 can be suppressed from occurring. The insulating member 24' is arranged both between the positive electrode 41 and the bottom-portion main body 21 and between the negative electrode 42 and the bottom-portion main body 21 in this improved example. However, the insulating member 24' may be arranged only either between the positive electrode 41 and the bottom-portion main body 21 or between the negative electrode 42 and the bottom-portion main body 21. In addition, the electrode for which the insulating member 24' is not arranged may be in contact with the bottom-portion main body 21. Also in this case, the positive electrode 41 and the negative electrode 42 can be prevented from continuing conducting electricity, and consequently erroneous operation of the feeder 52 can be suppressed from occurring.

In addition, the absorption sheet 23 may be provided below the positive electrode 41 and the negative electrode 42 in FIG. 9B. In this case, both the positive electrode 41 and the negative electrode 42 may be in contact with the absorption sheet 23. In this way, urine adhered to each of the electrodes can be absorbed by the absorption sheet 23, and the occurrence of the smell of urine or the like can be suppressed.

FIG. 10 is an explanatory diagram illustrating an example of an arrangement in the case where the plurality of positive electrodes 41 and the plurality of negative electrodes 42 are arranged side-by-side horizontally. The positive electrode 41 and the negative electrode 42 forming a pair are arranged side-by-side (spaced apart from each other) in the up-down direction in FIG. 4C. In contrast, the positive electrode 41 and the negative electrode 42 forming a pair are arranged side-by-side in the horizontal direction (in the left-right direction herein) in FIG. 10. A plurality of pairs of the positive electrode 41 and the negative electrode 42 are arranged side-by-side with spaces therebetween in the horizontal direction (the left-right direction). By arranging the plurality of pairs in this manner, the density of the electrodes can be increased, making it possible to increase the accuracy of the urination detection sensor 40.

[Third Modification]

Figure 11:
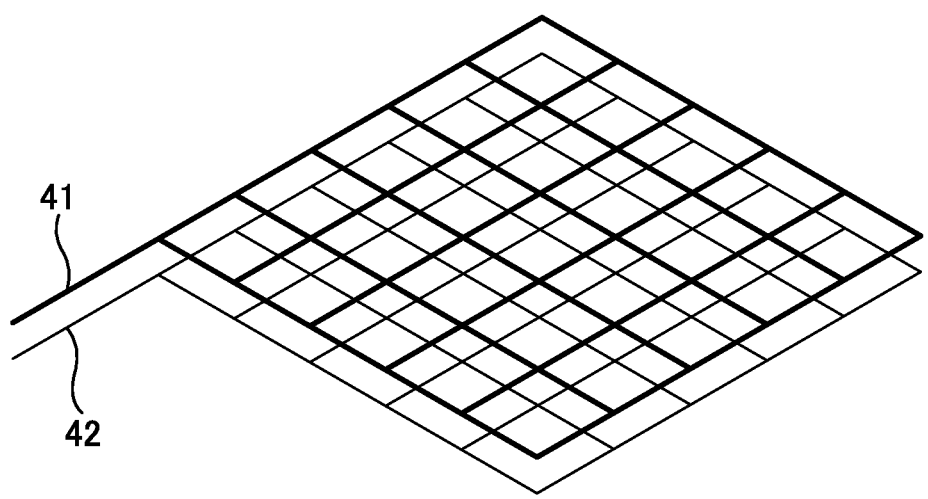
FIG. 11 is a conceptual diagram illustrating a third modification of the arrangement of the electrodes.

FIG. 11 is a conceptual diagram illustrating a third modification of the arrangement of the electrodes. In FIG. 11, the positive electrode 41 and the negative electrode 42 are denoted by solid lines of different thicknesses.

In the third modification, both the positive electrode 41 and the negative electrode 42 are configured to have a grating shape. That is, the positive electrode 41 includes portions intersecting with each other and the negative electrode 42 includes portions intersecting with each other. The positive electrode 41 and the negative electrode 42 having a grating shape are arranged to be spaced apart from each other in the up-down direction. Consequently, the electrodes can be arranged more densely, and the accuracy of the urination detection sensor 40 can be increased.

Other Embodiments

Although the embodiments of the present disclosure have been described hereinabove, the above embodiments of the present disclosure are simply to facilitate understanding of the present disclosure and are not in any way to be construed as limiting the present disclosure. The present disclosure may variously be changed or altered without departing from its gist and encompass equivalents thereof. For example, modification which will be described below is possible.

[Wall Portion 30]

In one or more embodiments described above, the wall portion 30 may be constituted by the plate wall 31, and the fence 32. However, the present invention is not limited thereto. Any configuration of the wall portion 30 may be employed. Also, it is acceptable that the wall portion 30 (including the access opening 33) is not provided.

[Feeding Plate 51]

In one or more embodiments described above, food is supplied to the feeding plate 51. However, the present invention is not limited thereto. For example, food may be scattered on the bottom portion 20.

[Feeder 52]

In the embodiments described above, though the feeder 52 is arranged outside the wall portion 30, the present invention is not limited thereto. The feeder 52 is arranged within the wall portion 30. However, in the case where the feeder 52 is arranged outside the wall portion 30, it is possible to widen an area in the toilet (excretion area). In addition, it is possible to prevent the dog from eating food stored in the feeder 52 (for example, the food container 100).

In addition, in the embodiments described above, the feeder 52 is provided as a device that operates on the basis of a detection result of the urination detection sensor 40. However, the device is not limited to this, and a device (operating device) that generates a stimulus favorable to a dog may be used. For example, a device that generates smell, sound, light, or the like may be provided, and the device may be caused to operate on the basis of a detection result of the urination detection sensor.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 10 dog toilet,
20 bottom portion, 21 bottom-portion main body (receptacle),
22 protruding portion, 23 absorption sheet (absorbent member),
24 grate (insulating member, liquid-permeable layer), 24a aperture,
24' insulating member,
25 cover,
30 wall portion,
31 plate wall,
32 fence,
33 access opening,
40 urination detection sensor,
41 positive electrode (first electrode),
42 negative electrode (second electrode),
43 liquid sensor,
50 feeder unit,
51 feeding plate,
51a bottom wall, 51b peripheral side wall,
52 feeder (operating device),
53 feeding tube, 53a feeding port,
54 power supply,
55 microcomputer,
56 relay circuit,
100 food container,
100a through hole,
110 scale, 111 rotational body,
111a bottom portion, 111b partition plate,
112 periphery wall portion,
112a opening,
120 motor,
510 convex member,
511 groove portion,
C1 center position,
C2 center position

What is claimed is:

1. A dog toilet comprising:
a receptacle in which a dog urinates;
a liquid-permeable layer, made of insulating material, comprising apertures through which excreted urine passes from an upper side to a lower side in an up-down direction of the liquid-permeable layer;
a urination detection sensor comprising a first electrode and a second electrode, wherein
the liquid-permeable layer is disposed between the first electrode and the second electrode in the up-down direction; and
an operating device that operates based on a conducting state of the first electrode and the second electrode, wherein
at least one of the first electrode and the second electrode is spaced apart from the receptacles,
the liquid-permeable layer is formed into a shape of a grate, the first electrode and second electrode are positioned directly overtop and within an entire width of the grate, and
a width of a bar of the grate is wider than a width of the first electrode and a width of the second electrode.

2. The dog toilet according to claim 1, wherein the insulating material is a non-absorbent material.

3. The dog toilet according to claim 2, further comprising:
an absorbent member disposed below the first electrode and the second electrode, wherein
the first electrode and the second electrode are spaced apart from the receptacle, and
the absorbent member comprises a liquid-absorbent absorbent body.

4. The dog toilet according to claim 2, wherein
the first electrode is spaced apart from the second electrode in the up-down direction, and
the first electrode at least partially overlaps the second electrode in a horizontal direction of the liquid-permeable layer.

5. The dog toilet according to claim 1, further comprising:
an absorbent member disposed below the first electrode and the second electrode in the up-down direction, wherein
the first electrode and the second electrode are spaced apart from the receptacle, and
the absorbent member comprises a liquid-absorbent absorbent body.

6. The dog toilet according to claim 5, wherein at least one of the first electrode and the second electrode contacts the absorbent member.

7. The dog toilet according to claim 5, wherein
the first electrode is spaced apart from the second electrode in the up-down direction, and
the first electrode at least partially overlaps the second electrode in a horizontal direction of the liquid-permeable layer.

8. The dog toilet according to claim 1, wherein
the first electrode is spaced apart from the second electrode in the up-down direction, and
the first electrode at least partially overlaps the second electrode in a horizontal direction of the liquid-permeable layer.

9. The dog toilet according to claim 1, wherein the urination detection sensor further comprises:
a plurality of pairs of first and second electrodes disposed side-by-side in a horizontal direction of the liquid-permeable layer.

10. The dog toilet according to claim 1, wherein the urination detection sensor further comprises:
a plurality of first electrodes and a plurality of second electrodes, wherein
each of the first electrodes is spaced apart from each of the second electrodes in the up-down direction,
the first electrodes and second electrodes have a grating shape.

* * * * *